US008540310B2

(12) United States Patent
Suhre

(10) Patent No.: US 8,540,310 B2
(45) Date of Patent: Sep. 24, 2013

(54) DEPLOYABLE IN-SEAT CUP HOLDER

(75) Inventor: Ryan J. Suhre, Winston Salem, NC (US)

(73) Assignee: BE Aerospace, Inc., Wellington, FL (US)

( * ) Notice: Subject to any disclaimer, the term of this patent is extended or adjusted under 35 U.S.C. 154(b) by 88 days.

(21) Appl. No.: 13/205,007

(22) Filed: Aug. 8, 2011

(65) Prior Publication Data

US 2012/0032479 A1 Feb. 9, 2012

Related U.S. Application Data

(60) Provisional application No. 61/371,838, filed on Aug. 9, 2010.

(51) Int. Cl.
*A47C 7/62* (2006.01)
(52) U.S. Cl.
USPC ............... 297/188.04; 297/188.15; 248/311.2
(58) Field of Classification Search
USPC ............. 297/188.04, 188.05, 188.06, 188.07, 297/188.14, 188.15, 188.16, 188.01; 248/311.2
See application file for complete search history.

(56) References Cited

U.S. PATENT DOCUMENTS

| 5,060,899 A * | 10/1991 | Lorence et al. ............ 248/311.2 |
| 5,318,343 A * | 6/1994 | Spykerman et al. ...... 297/188.16 |
| 5,673,891 A * | 10/1997 | Fujihara et al. ............ 248/311.2 |
| 5,897,089 A * | 4/1999 | Lancaster et al. .......... 248/311.2 |
| 5,997,082 A * | 12/1999 | Vincent et al. ........... 297/188.19 |
| 6,349,913 B1 * | 2/2002 | Jankowski ................. 248/311.2 |
| 6,427,960 B1 * | 8/2002 | Gehring et al. ............. 248/311.2 |
| 6,464,187 B1 * | 10/2002 | Bieck et al. ................. 248/311.2 |
| 6,685,152 B2 * | 2/2004 | Shirase et al. ............. 248/311.2 |
| 7,131,690 B2 * | 11/2006 | Bollaender et al. ...... 297/188.17 |
| 7,278,619 B2 * | 10/2007 | Kiyohara et al. .......... 248/311.2 |
| 2003/0030308 A1 * | 2/2003 | Yuzawa .................... 297/188.01 |
| 2003/0090130 A1 * | 5/2003 | Schaal ..................... 297/188.01 |
| 2004/0112930 A1 | 6/2004 | Beglau |
| 2004/0262480 A1 * | 12/2004 | Moyer ....................... 248/311.2 |
| 2006/0060741 A1 * | 3/2006 | Yanagita et al. ........... 248/311.2 |
| 2006/0261644 A1 * | 11/2006 | Cutshall et al. ............... 297/173 |

FOREIGN PATENT DOCUMENTS

| EP | 0 447 263 A2 | 9/1991 |
| EP | 1 033 282 A2 | 9/2000 |

OTHER PUBLICATIONS

International Search Report dated Dec. 22, 2011 for International PCT Application No. PCT/US0211/046914.

* cited by examiner

*Primary Examiner* — David Dunn
*Assistant Examiner* — Alexander Harrison
(74) *Attorney, Agent, or Firm* — Shumaker, Loop & Kendrick, LLP

(57) ABSTRACT

A deployable cup holder including linkage arranged such that a portion of the linkage is movable between a folded configuration positioned within a space defined in a seat, and a deployed configuration positioned forming a closed loop defining an opening between the linkage, the linkage including a ground link, first and second grounded links, and a coupler link, wherein the ground link and the coupler link are pivotably connected to each of the first and second grounded links to define a closed loop.

18 Claims, 4 Drawing Sheets

DEPLOYABLE IN-SEAT CUP HOLDER

CROSS-REFERENCE TO RELATED APPLICATION

This non-provisional patent application claims priority to U.S. Provisional Patent Application No. 61/371,838 filed Aug. 9, 2010, the contents of which are incorporated by reference herein.

TECHNICAL FIELD AND BACKGROUND

The exemplary embodiment provided herein relates generally to a cup holder associated with a passenger seat, and more particularly, to a deployable in-seat cup holder configured to fold to a compact, stowed configuration into a space defined in a seat bezel when not in use, and extends to an in-use, deployed configuration away from monitor and tray table assemblies to permit the simultaneous use of these assemblies.

Passenger seats commonly house and carry seat accessories such as cup holders, tray tables, video monitors and controls, among others. These accessories, for example, are often associated with an armrest for use by an adjacent seated passenger, or mounted within a seat back for use by an aft-seated passenger. Accessories may be carried on seat components or integrated into seat frames, coverings or carried on other accessories. Cup holders, for example, are often provided as an extension of an armrest or as a depression within a surface of a tray table. With regard to cup holder associations with tray tables, such configurations may be advantageous in terms of reducing seat complexity, but disadvantageously require the tray table be deployed to use the cup holder.

Accordingly, a deployable cup holder associated with a seat that folds into a compact configuration in a dedicated space in the seat is provided herein that overcomes the disadvantages of conventional cup holder designs.

BRIEF SUMMARY

In one embodiment, a deployable cup holder is provided herein including linkage arranged such that a portion of the linkage is movable between a folded configuration positioned within a space defined in a seat, and a deployed configuration positioned forming a closed loop defining an opening between the linkage. The linkage can fold to stow within a space defined within a seat bezel of the seat, and the linkage can deploy to a position away from a tray table assembly associated with the seat to permit the simultaneous use of cup holder and the tray table.

In one aspect, the linkage may include a four-bar linkage including a ground link, first and second grounded links, and a coupler link, wherein the ground link and the coupler link are pivotably connected to each of the first and second grounded links.

In another aspect, the linkage may include a latch carried on the ground link that releasably engages the first grounded link. The latch may be a push-to-close type latch.

In a further aspect, the linkage may include a biasing member biasing rotation of the first grounded link in the direction away from the ground link. The biasing member may maintain a biasing force on the first grounded link when the cup holder is in the deployed configuration to keep the ground link, the first and second grounded links and the coupler link tight.

In a further aspect, the linkage may include a damper associated with a pivot of the ground link and the first grounded link for impeding rapid rotation of the first grounded link relative to the ground link.

In a further aspect, when in the folded configuration, the second grounded link may be housed within the coupler link, and the first grounded link may be housed within the ground link to achieve a compact folded configuration.

In a further aspect, the cup holder may include indicia carried on at least one of the first grounded link and the coupler link for identifying the cup holder.

In another embodiment, a deployable cup holder is provided herein including linkage including a ground link, first and second grounded links, and a coupler link, the ground link and the coupler link being pivotably connected to each of the first and second grounded links, and wherein the first and second grounded links and the coupler link are cooperatively movable between a folded configuration positioned within a space defined in a seat, and a deployed configuration positioned forming a closed loop defining an opening between the linkage. The first grounded link may drive the movement of the second grounded link and the coupler link. The linkage may fold to stow within a space defined within a seat bezel of the seat, and the linkage may deploy to a position away from a tray table assembly associated with the seat to permit the simultaneous use of cup holder and the tray table.

DETAILED DESCRIPTION OF THE EMBODIMENT

Figure 1:
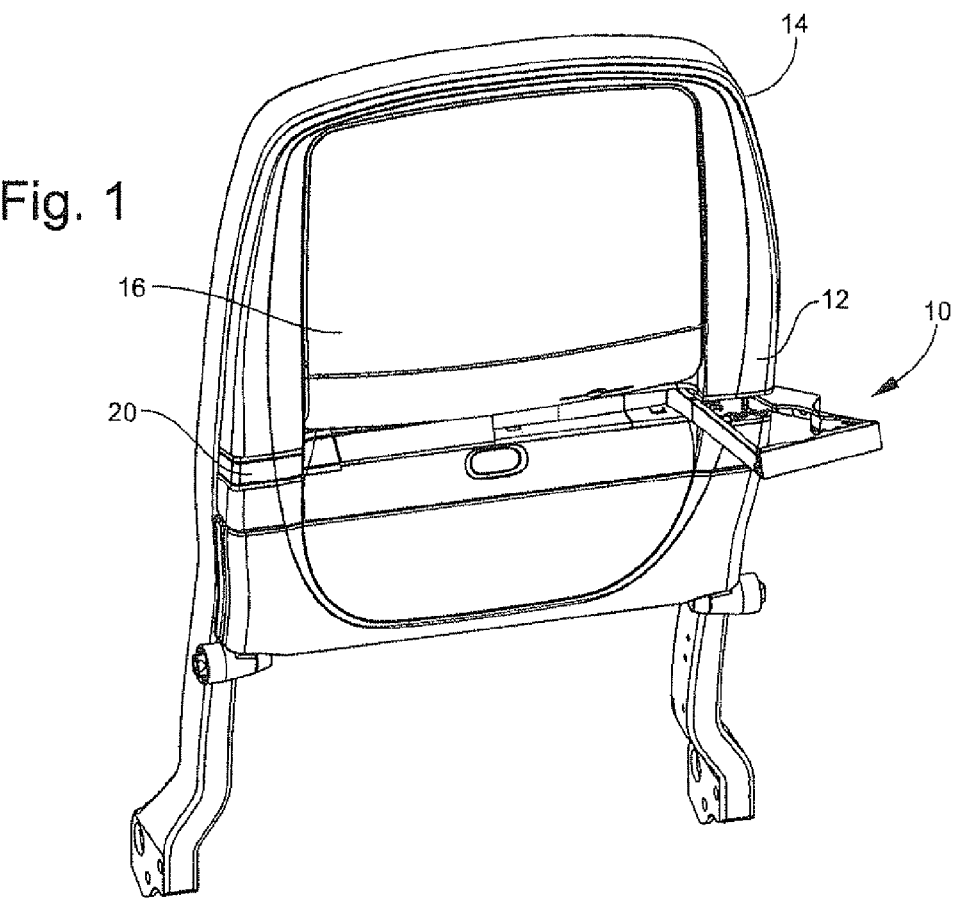
FIG. 1 is a perspective view of a portion of a seat back including a cup holder associated with a seat bezel in accordance with an exemplary embodiment.

An exemplary embodiment of a deployable in-seat cup holder is described herein with reference to the accompanying drawings in which like reference numerals are used to refer to like components. Although an exemplary embodiment is described and shown herein, it should be understood that the exemplary embodiment may be embodied in many different forms and should not be construed as limited to the representative embodiment set forth herein. The exemplary embodiment is provided so that this disclosure is both thorough and complete, and fully conveys the scope of the invention and enables one of ordinary skill in the art to make, use and practice the invention.

Referring to the figures, an in-seat cup holder is shown generally throughout the figures at reference numeral 10. The cup holder 10 provided herein is configured to be mounted flush with the surface of a surrounding bezel 12 of a seat back 14 or like structure when stowed, and deployed for use as needed by manually actuating a push-to-close type latch for opening/closing the cup holder 10. The cup holder 10 advantageously stows by folding into a compact space defined in the bezel 12 and seat back 14, and opens to a deployed configuration independent of and out of the way of the operation of a tray table assembly 16 and/or monitor of the seat.

Figure 2:
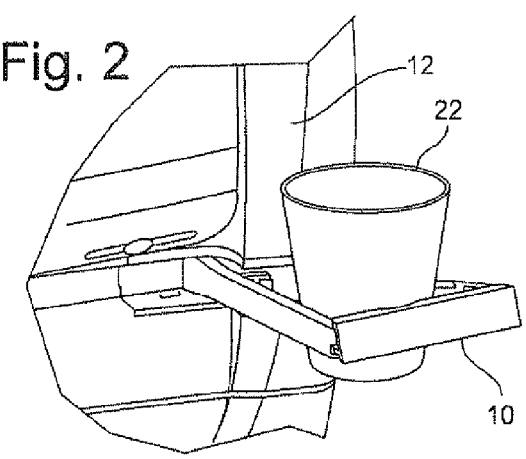
FIG. 2 is a detailed view of a portion of the seat back of FIG. 1 showing the cup holder in a deployed configuration.
Figure 3:
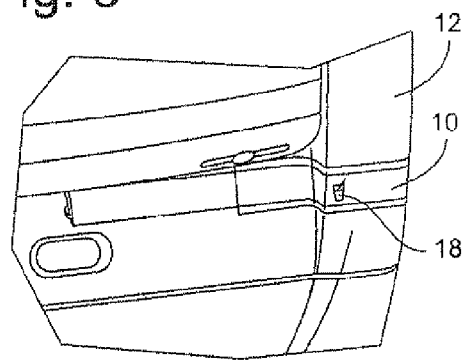
FIG. 3 is a detailed view of a portion of the seat back of FIG. 1 showing the cup holder in a stowed configuration.

Referring to FIGS. 1 and 2, the cup holder 10 is shown in the deployed configuration positioned about one side of the seat back 14 laterally offset from the operating room required by the tray table 16 and/or monitor. As shown, the cup holder 10 is mounted to the right side of the seat back 14 at a height about level with the surface of a deployed tray table. It is intended, however, that the cup holder 10 can be located in other positions with regard to the seat. In a preferred configuration, the seat bezel 12 may be made symmetrical such that the cup holder 10 can be mounted on either side of the seat back 14 as desired. As shown, the left-side mounting location is unoccupied and covered with a cover 20 that mounts flush with the surrounding bezel 12. It is envisioned that both the left and right side mounting locations may be utilized at the same time to provide a seat having dual cup holders 10, both of which deploy out of the way of the tray table 16 and/or monitor. Referring specifically to FIG. 2, the cup holder 10 is shown fully deployed and holding a cup 22. Referring specifically to FIG. 3, the cup holder 10 is shown fully stowed and flush with the surrounding bezel 12. The cup holder 10 may display indicia 18 thereon, for example a graphic of a beverage, to indicate the identity of the assembly and instruct a seat occupant where to press the master link 26 to actuate the latch 32. The latch 32 and indicia 18 can be aligned to facilitate operation. The indicia may include operating instructions for actuating the latch 32.

Figure 4:
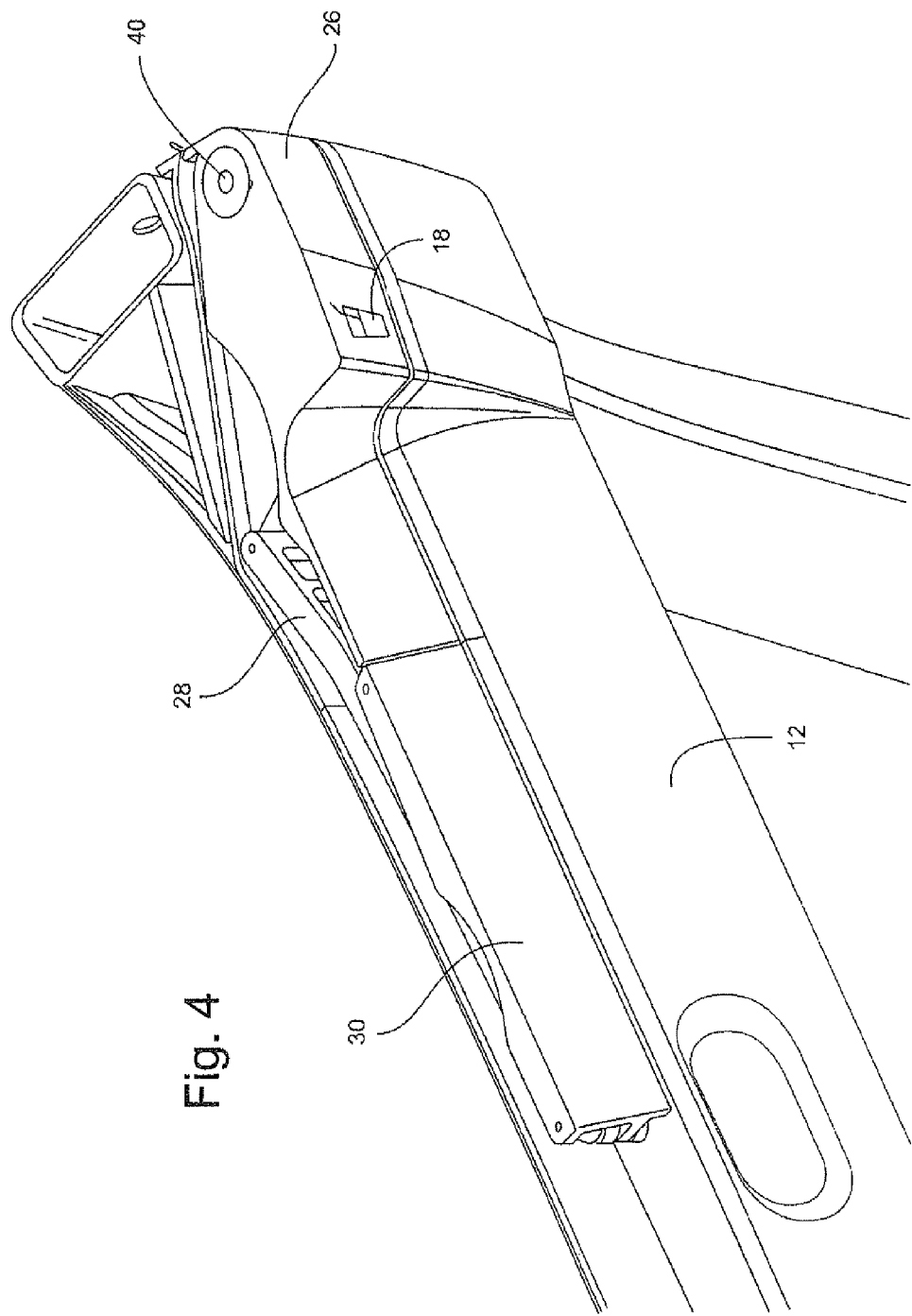
FIG. 4 is a sectional perspective and top view taken through the portion of the seat bezel of FIG. 1 immediately above the cup holder.
Figure 5:
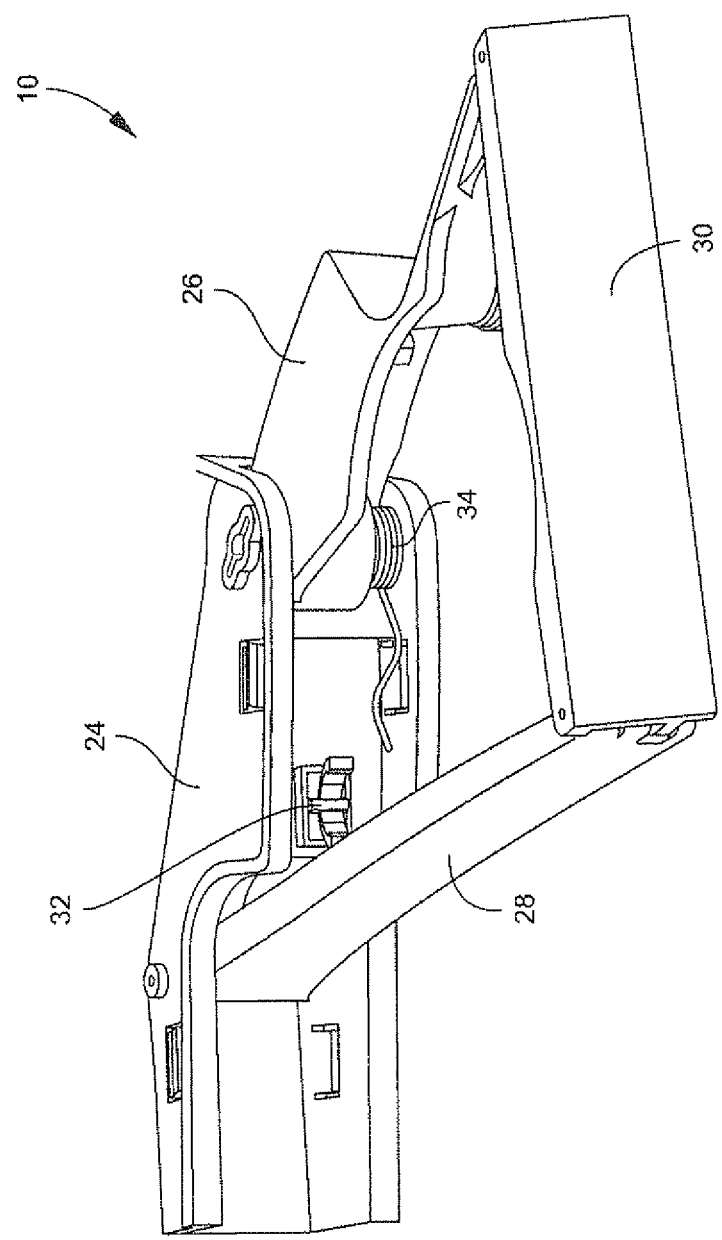
FIG. 5 is a detailed view of the cup holder shown in the deployed configuration.
Figure 6:
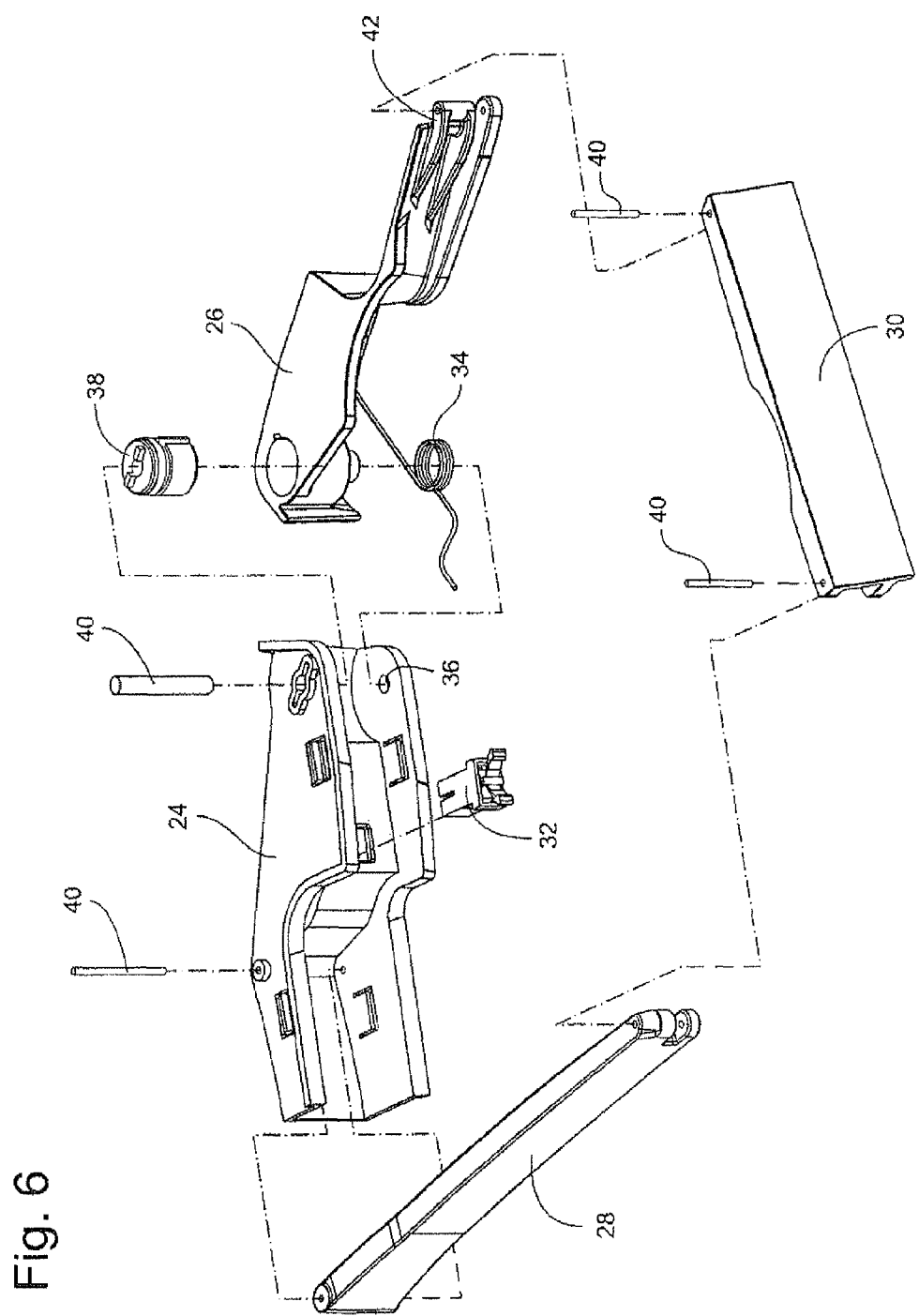
FIG. 6 is an exploded view illustrating the components of the cup holder in accordance with an exemplary embodiment.

Referring to FIGS. 4-6, the cup holder 10 embodiment shown is a four-bar linkage generally including four rigid bodies, each attached to two others by single joints or pivots to form a closed loop. Specifically, the linkage includes a stationary ground link 24, first and second grounded links 26, 28, and a coupler link 30. As used herein, the ground link 24 is also referred to as the "housing," as the ground link 24 houses the first and second grounded links 26, 28 and the coupler link 30 in their stowed positions. As used herein, the first grounded link 26 is also referred to as the "master link," as the first grounded link 26 engages the push-to-close latch 32 and drives the movement of the second grounded link 28 and the coupler link 30. The latch 32 is carried on the ground link 24.

The assembly further includes a torsion spring 34 associated with the pivot 36 of the master link 26 and ground link 24 for applying a force on the master link 26 and urging the master link 24 toward the open direction. A damper, such as a viscous hinge damper 38, is associated with the pivot 36 and impedes rapid rotation of the master link 26 relative to the ground link 24, thus preventing overly rapid deployment of the cup holder 10. Pivots of the four links are achieved through hinge pins 40. The hinge pin 40 associated with the pivot 36 of the ground link 24 is received through the hinge damper 38, master link 26 and torsion spring 34.

To "open" the linkage, force is applied to the master link 26 by pressing on the link, such as with a fingertip, to actuate the push-to-close latch 32. The resulting release of the master link 26 from the latch 32 causes the force in the wound torsion spring 34 to rotate the master link 26 outward away from the housing 24, thereby pulling the second grounded link 28 and the coupler link 30 along therewith. With the damper 38 impeding the rapid rotation of the master link 26, rotation of the master link 26 relative to the housing 24 can be stopped by, for example, contact between the second grounded link 28 and the housing 24. Upon such contact, the torsion spring 34 remains partially wound, and thus keeps the links taught and preloads all the joints so that they are not loose and do not rattle. As shown in FIG. 5, rotation of the master link 26 relative to the housing 24 results in an angle slightly greater than about 90 degrees therebetween to fully open the cup holder 10.

To "close" the linkage, either master link 26 or coupler link 30 is manipulated by hand, such as by pressing inward in the direction of the seat, to rotate the master link 26 toward the housing 24 to engage a feature 42 defined or carried on the interior surface of the master link 26 with the latch 32, thus pushing the other linkage members to their starting (i.e., stowed) positions. Latch 32 maintains the engagement of the master link 26 until re-actuated. The master link 26 is housed within the housing 24 when the cup holder 10 is closed.

Referring specifically to FIG. 5, the assembled cup holder 10 is shown in the fully deployed configuration. The master link 26 and the coupler link 30 each define a generally arcuate-shaped recessed portion 48 along their lengths for cooperatively conforming to the cylindrical shape of a beverage container, or "cup," to securely hold the cup in the cup holder 10. Although not shown, ground link 24 and second grounded link 28 may also define a generally arcuate-shaped recess. The cup holder 10 may further include other means for holding the cup, accommodating different sized cups and absorbing shock, such as rubber grips or an elastic diaphragm as known to those skilled in the art.

Referring specifically to FIG. 4, a sectional view taken through the seat back 14 immediately above the master link 26 shows a portion of the cup holder 10 in the fully stowed configuration. The upper flange of the ground link 24 is shown removed for clarity. In the stowed configuration, the master link 26 is rotated against the housing 24 with the front face thereof flush with the surrounding bezel 12. The second grounded link 28 and the coupler link 30 are arranged generally parallel to one another and a portion of the second grounded link 28 is received within the larger coupler 30 to further enhance compactness and save space. The cup holder 10 folds to a compact, generally linear configuration that when stowed does not require significantly more depth than the seat bezel 12. The cup holder can be secured to the seat or seat bezel by securing the ground link 24 to the seat frame or bezel 12 using any suitable fastener or fastening technique.

The linkage of the cup holder 10 can be constructed from any material, with preferable materials including rigid plastics and like materials that can be colored to match the appearance of the surrounding bezel 12, for example.

While an in-seat cup holder has been described with reference to a specific embodiment and examples, it is envisioned that various details of the invention may be changed without departing from the scope of the invention. Furthermore, the foregoing description of the exemplary embodiment of the invention and best mode for practicing the invention are provided for the purpose of illustration only and not for the purpose of limitation.

What is claimed is:

1. A deployable cup holder for a seat back portion of a seating assembly, including the seat back and a seat bottom, comprising:
    (a) a plurality of linkage elements mounted for pivotal movement on respective vertical axes and adapted for being moved about the respective vertical axes in a single lateral plane between a folded, stowed position in the seat back and a deployed position extending outwardly from the seat back in the single lateral plane;
    (b) a cup holder portion having a cup-holding void defined by the linkage elements when the linkage elements are in the deployed position; and (c) a biasing element interconnecting the linkage elements to bias the linkage elements in the deployed position wherein, in the stowed position in the seat back, the links extend generally parallel with a rear surface of the seat back.

2. The deployable cup holder according to claim 1, wherein the plurality of linkage elements folds to stow within a space defined within a seat bezel of the seat back and wherein the single lateral plane is perpendicular to a plane of a stowed tray table carried by the seat back, and the plurality of linkage elements deploys to a position away from a tray table assembly when deployed to permit the simultaneous use of the cup holder and the deployed tray table assembly.

3. The deployable cup holder according to claim 1, wherein the plurality of linkage elements comprises a four-bar linkage, having no more than four total links, including a ground link, first and second grounded links, and a coupler link, wherein each of the links are in the single lateral plane and at least three of the links define a generally recessed portion forming the closed loop and wherein the ground link and the coupler link are pivotably connected to each of the first and second grounded links.

4. The deployable cup holder according to claim 3, further comprising a latch carried on the ground link that releasably engages the first grounded link.

5. The deployable cup holder according to claim 4, wherein the latch is a push-to-close type latch.

6. The deployable cup holder according to claim 3, wherein the biasing element biases the rotation of the first grounded link in the direction away from the ground link.

7. The deployable cup holder according to claim 6, wherein the biasing element maintains a biasing force on the first grounded link when the cup holder is in the deployed configuration to keep the ground link, the first and second grounded links and the coupler link tight.

8. The deployable cup holder according to claim 3, wherein the plurality of linkage elements further comprises a damper associated with a pivot of the ground link and the first grounded link for impeding rapid rotation of the first grounded link relative to the ground link.

9. The deployable cup holder according to claim 3, wherein, in the stowed configuration, the second grounded link is received within the coupler link, and the first grounded link is received within the ground link.

10. The deployable cup holder according to claim 3, further comprising indicia carried on at least one of the first grounded link and the coupler link for identifying the cup holder.

11. A deployable cup holder for a seat back portion of a seating assembly, including the seat back and a seat bottom, comprising:
(a) a plurality of linkage elements mounted for pivotal movement on respective vertical axes and adapted for being moved about the respective vertical axes in a single lateral plane between a folded, stowed position in the seat back and a deployed position extending outwardly from the seat back in the single lateral plane;
(b) a cup holder portion having a cup-holding closed void defined by the linkage elements when the linkage elements are in the deployed position;
(c) a biasing element interconnecting the linkage elements to bias the linkage elements in the deployed position;
(d) wherein the plurality of linkage elements comprises no more than four total links, at least three of the links having a generally recessed portion, including a ground link, first and second grounded links, and a coupler link, the ground link and the coupler link being pivotally connected to each of the first and second grounded links; and
(e) wherein the first and second grounded links and the coupler link are cooperatively movable between the stowed position within a space defined in a seat bezel, and the deployed position wherein the linkage elements rotate in the same direction when moved between the stowed and deployed positions.

12. The deployable cup holder according to claim 11, wherein the first grounded link drives the movement of the second grounded link and the coupler link within the single plane.

13. The deployable cup holder according to claim 11, wherein the linkage folds to stow within a space defined within a seat bezel of the seat and wherein the single lateral plane is perpendicular to a plane of a stowed tray table, and the linkage deploys to a position away from a deployed tray table assembly associated with the seat to permit the simultaneous use of the cup holder and the deployed tray table assembly.

14. The deployable cup holder according to claim 11, wherein the ground link includes a latch that releasably engages the first grounded link to hold the linkage in the stowed configuration.

15. The deployable cup holder according to claim 11, wherein the biasing element biases the rotation of the first grounded link in the direction away from the ground link.

16. The deployable cup holder according to claim 15, wherein the biasing element maintains a biasing force on the first grounded link when the cup holder is in the deployed position to keep the ground link, the first and second grounded links and the coupler link tight.

17. The deployable cup holder according to claim 11, wherein the plurality of linkage elements further comprises a damper associated with a pivot of the ground link and the first grounded link for impeding rapid rotation of the first grounded link relative to the ground link.

18. The deployable cup holder according to claim 11 , wherein, in the stowed position, the second grounded link is received within the coupler link, and the first grounded link is received within the ground link.

* * * * *